United States Patent
Keskar et al.

(10) Patent No.: US 7,120,299 B2
(45) Date of Patent: Oct. 10, 2006

(54) RECOGNIZING COMMANDS WRITTEN ONTO A MEDIUM

(75) Inventors: Dhananjay V. Keskar, Beaverton, OR (US); Mic Bowman, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 603 days.

(21) Appl. No.: 10/041,103

(22) Filed: Dec. 28, 2001

(65) Prior Publication Data

US 2003/0123733 A1 Jul. 3, 2003

(51) Int. Cl.
G06K 9/00 (2006.01)

(52) U.S. Cl. .................... 382/187; 382/188

(58) Field of Classification Search ........... 382/100, 382/229, 917, 906, 187–189; 358/468; 283/72, 902; 399/366; 386/94; 705/57, 705/58; 356/71
See application file for complete search history.

(56) References Cited

U.S. PATENT DOCUMENTS

| | | | |
|---|---|---|---|
| 4,794,634 A | 12/1988 | Torihata et al. | |
| 4,841,387 A | 6/1989 | Rindfuss | |
| 4,845,768 A | 7/1989 | Kochert et al. | |
| 5,181,255 A | 1/1993 | Bloomberg | |
| 5,243,149 A | 9/1993 | Comerford et al. | |
| RE34,476 E | 12/1993 | Norwood | |
| 5,309,359 A | 5/1994 | Katz et al. | |
| 5,363,211 A * | 11/1994 | Hasebe et al. | 358/451 |
| 5,615,285 A | 3/1997 | Beernink | |
| 5,629,499 A | 5/1997 | Flickinger et al. | |
| 5,652,412 A | 7/1997 | Lazzouni et al. | |
| 5,748,807 A * | 5/1998 | Lopresti et al. | 382/310 |
| 5,751,851 A | 5/1998 | Guzik et al. | |
| 5,768,418 A * | 6/1998 | Berman et al. | 382/187 |
| 5,802,204 A | 9/1998 | Basehore | |
| 5,869,789 A | 2/1999 | Reid-Green | |
| 5,890,177 A | 3/1999 | Moody et al. | |
| 5,897,648 A * | 4/1999 | Henderson | 715/530 |
| 5,960,448 A | 9/1999 | Reichek et al. | |
| 5,977,958 A | 11/1999 | Baron et al. | |
| 6,000,946 A | 12/1999 | Snyders et al. | |
| 6,050,490 A | 4/2000 | Leichner et al. | |
| 6,154,758 A | 11/2000 | Chiang | |
| 6,249,283 B1 | 6/2001 | Ur | |
| 6,259,043 B1 | 7/2001 | Clary et al. | |
| 6,360,951 B1 | 3/2002 | Swinehart | |
| 6,396,481 B1 | 5/2002 | Challa et al. | |
| 6,396,598 B1 | 5/2002 | Kashiwagi et al. | |
| 6,397,213 B1 | 5/2002 | Cullen et al. | |
| 6,466,954 B1 * | 10/2002 | Kurosawa et al. | 715/520 |
| 6,584,479 B1 | 6/2003 | Chang et al. | |
| 6,625,335 B1 | 9/2003 | Kanai | |
| 6,666,376 B1 | 12/2003 | Ericson et al. | |

(Continued)

OTHER PUBLICATIONS

BrightBoard: A Video-Augmented Environment, Rank Xerox Research Centre (EuroPARC).

(Continued)

*Primary Examiner*—Jingge Wu
*Assistant Examiner*—Brian Le
(74) *Attorney, Agent, or Firm*—Crystal D. Sayles

(57) ABSTRACT

A method includes obtaining a scanned command mark written with a conventional writing implement onto a conventional medium, and recognizing the scanned command mark as a command that may be executed by a processor. The method may further include recognizing a command mark that comprises a notational, transformational and operational mark.

30 Claims, 4 Drawing Sheets

U.S. PATENT DOCUMENTS

| | | | |
|---|---|---|---|
| 6,681,372 | B1 | 1/2004 | Yajima |
| 6,687,876 | B1 | 2/2004 | Schilit et al. |
| 6,698,660 | B1 | 3/2004 | Fahraeus et al. |
| 6,721,921 | B1 | 4/2004 | Altman |
| 6,742,161 | B1 | 5/2004 | James et al. |
| 6,782,144 | B1 | 8/2004 | Bellavita et al. |
| 2002/0088651 | A1 | 7/2002 | Carini et al. |
| 2002/0095440 | A1 | 7/2002 | Burgess et al. |
| 2002/0102022 | A1 | 8/2002 | Ma et al. |
| 2002/0114508 | A1 | 8/2002 | Love |
| 2002/0135786 | A1 | 9/2002 | Ma et al. |
| 2002/0184196 | A1 | 12/2002 | Lehmeier et al. |
| 2003/0004991 | A1 | 1/2003 | Keskar et al. |
| 2003/0026481 | A1 | 2/2003 | Keskar et al. |
| 2003/0089533 | A1 | 5/2003 | Lapstun et al. |
| 2003/0167276 | A1 | 9/2003 | Simpson et al. |

OTHER PUBLICATIONS

Smartpad—http://www.seikosmart.com/products/sp580.html.
Ecrio licenses technology to SmartPad—http://www.ecrio.com/cnctdnpp.shtml.
ThinkPad TransNote—http://commerce.www.ibm.com/cgi-bin.ncommerce?Category Display?.
Crosspad—discontinued. http://www.cross.com/cross/crosspads.html.
Anoto—http://www.anoto.com.
InMotion—http://www.e-pen.com/.
DigiMarc Mediabridge Print to Web Watermarking solutions, http://digimarc.com/mediabridge.index.htm.
Charles L. Rubin, "Running Microsoft Word 2000," pp. 832-837 (1999).
ScanSoft home page, http://www.scansoft.com, Jun. 28, 2001 (1 page).
http://www.nocc.org/bytes/revuprod/v01/493.html, Orange Bytes, "I.R.I.S.> Pen—Controllable ORC At Your Fingertips", Millward, Feb. 2000.
http://www.irisusa.com/Products/irispen.html, "Irispen a handheld scanner by IRIS", last updated Mar. 23, 2001.
http://www.anoto.com/print_page.asp?cid=1, "Anoto—join the revolution", printed Jun. 6, 2001.
http://exn.ca/Templates/printstory.asp?PageName=Discovery &story id=2000042752, "High Tech Pens", printed Jun. 5, 2001.
http://www.wired.com/news/comdex/0,1886,40190,00.tml, "Bluetooth Comes to Your notebook", Gartner, Nov. 15, 2000.
http://www.gen.com/vol120_no9/tech-report/4046-1.html, "New Tools Keep Users Connected Anywhere", Jackson, Apr. 30, 2001.
http://www.cpen.com/, C-pen homepage, printed Jun. 5, 2001.
U.S. Appl. No. 09/896,123; Title: Correlating Handwritten Annotations to a Document; Filing Date: Jun. 29, 2001; Inventor: Dhananjay V. Keskar.

* cited by examiner

RECOGNIZING COMMANDS WRITTEN ONTO A MEDIUM

TECHNICAL FIELD

This invention relates to a machine-executable process for recognizing commands written onto a medium, such as paper.

BACKGROUND

In the modern workplace a variety of computer resources are generally available, such as desk-top or lap-top computers. Entering information or commands to a computer is typically accomplished by using a keyboard or a mouse connected to a computer.

Despite the availability of computer resources, many people still use more traditional methods and mediums to record information, such as writing notes and action items on paper using a pen or pencil.

DESCRIPTION

Figure 1:
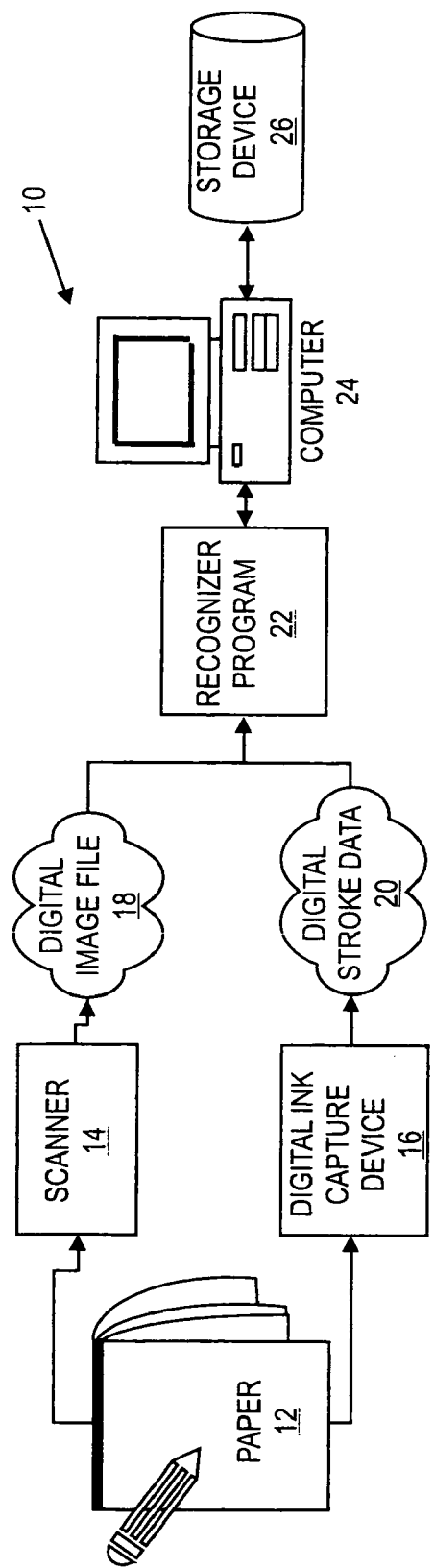
FIG. 1 is a flowchart showing a command recognition process.

Referring to FIG. 1, a process 10 is shown for recognizing commands written on a piece of paper. Process 10 is basically a three part process. First, a command mark is written on a piece of paper 12 using a conventional writing implement, such as a pen or pencil. Second, the command mark is converted into digital information, either as a digital image file 18 or digital stroke data 20, using either a scanner 14 or a digital ink capture device 16, respectively. Third, the digital information is processed by a recognizer program 22 that performs pattern recognition to recognize the command mark and convert the recognized command mark into an executable command, i.e., a command that may be executed by a computer 24. The executable command is either executed immediately by computer 24, or, the digital information and the converted executable command are stored for later review and execution, respectively, on a storage device 26 connected to computer 24.

Performing process 10 enables a writer to write specific marks (or strokes) on a piece of paper, which are interpreted as executable commands that are either executed immediately by a computer processor, or executed at a later time. Process 10 simplifies the input, recognition and subsequent management of written commands and digital images, using a very common and widespread method of storing information, e.g., by writing commands and information on a conventional medium, such as a piece of paper or cardboard, with a conventional writing implement, such as a pen or pencil. Pre-printed material may also be processed using process 10 where the pre-printed materials are supplemented with written command marks and then processed by the recognizer program 22.

Figure 2A:
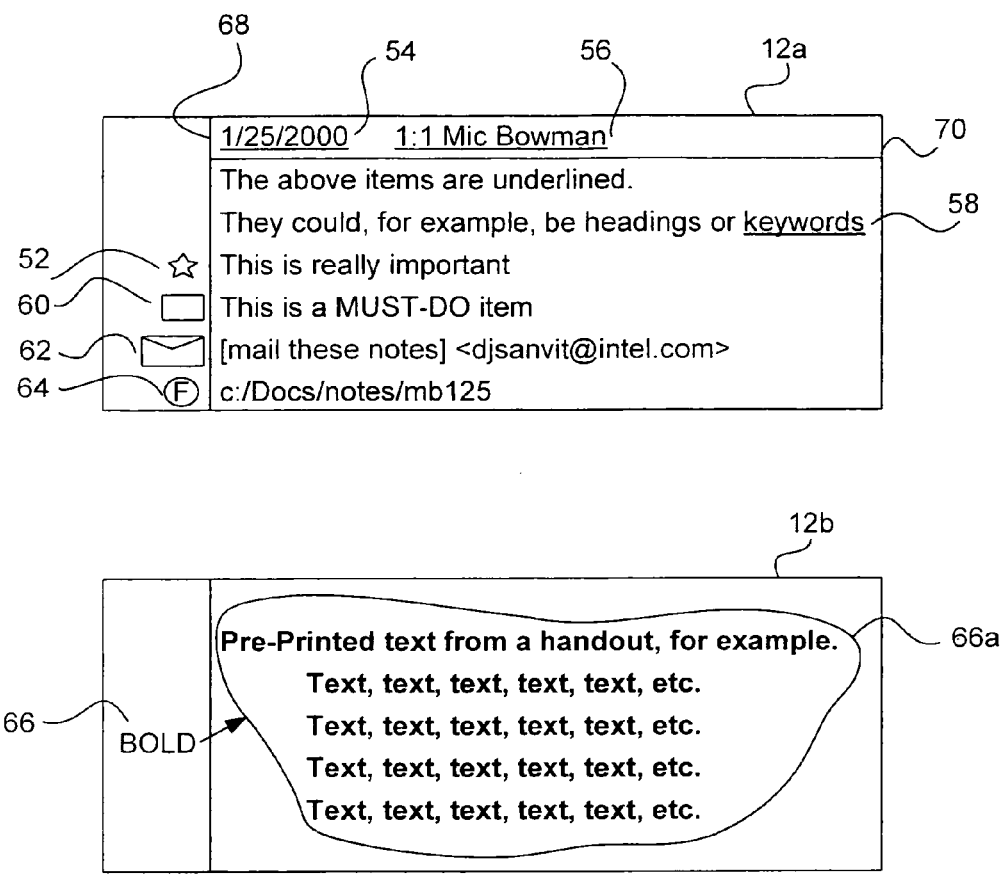
FIG. 2A–2B shows exemplary command marks written on pieces of paper.

Referring to FIG. 2, exemplary pieces of paper 12a and 12b include several written command marks that may be recognized and interpreted by process 10. In an embodiment according to the invention, command marks are categorized as notational, operational and transformational command marks. Notational marks typically indicate important phrases, dates and keywords. For example, on paper 12a, a star symbol 52 may indicate an important item, an underlined phrase 54, 56 and 58, may indicate a date, a heading or a keyword, respectively. Operational marks typically indicate specific operations to be performed by a computer 24. For example, on paper 12a, a box symbol 60 may indicate an item of information to be included in a task list (a "to-do" item), an envelope symbol 62 may indicate an item is to be mailed to another computer user, and a filing command symbol 64 may indicate that the digital image file represented by paper 12a is to be stored as a file on storage device 26. Transformational marks are typically used to indicate the transformation (a change) to a specific section of text included on a piece of paper, for example, on paper 12b, a bold command mark 66 indicates the circled section of text 66a should be re-formatted using bold text.

Figure 2B:
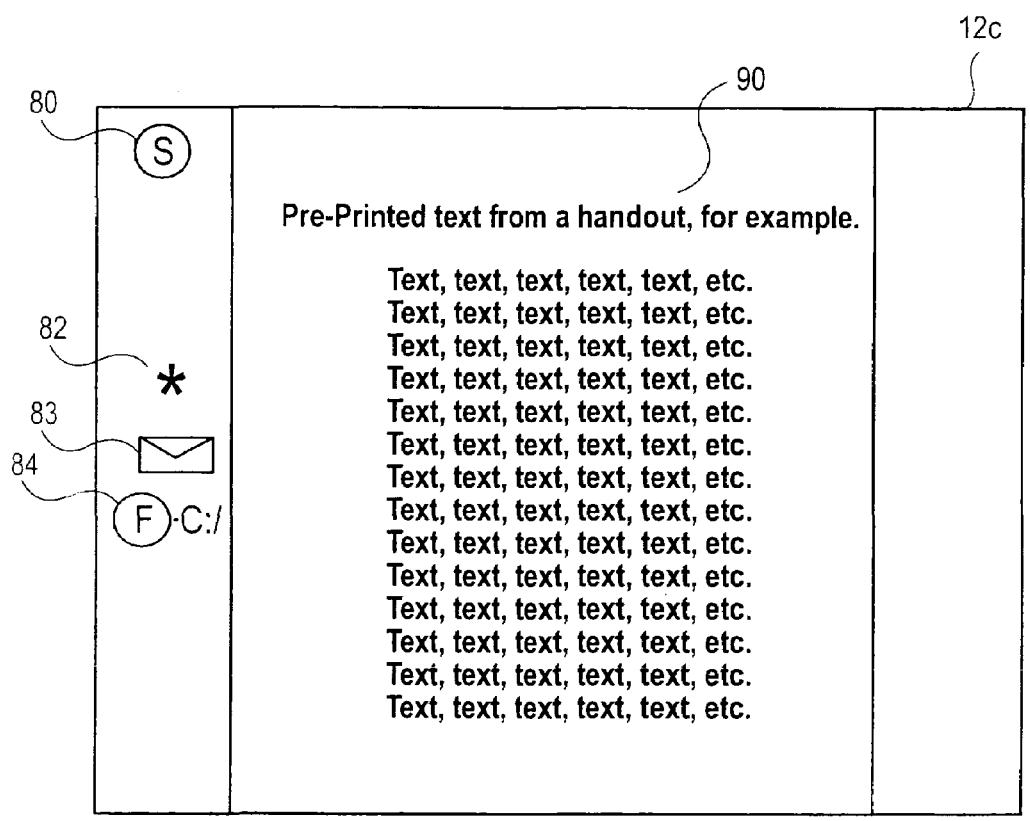

Referring to FIG. 2B, an exemplary piece of paper 12c, includes preprinted text region 90, a special command mark 80 and secondary command marks 82–84. In an embodiment, special command mark 80 must be recognized by recognizer program 22 before secondary command marks, 82–84 are recognized by recognizer program 22. In an embodiment of process 10, special command mark 80 is written with a conventional writing implement, such as a pen or pencil, onto a conventional pre-printed medium, such as piece of paper 12c (or, onto a pre-printed piece of cardboard or plastic), and the conventional medium 12c is scanned as a digital image and processed by recognizer program 22. In this embodiment, recognizer program 22 recognizes special command mark 80 before recognizing secondary command marks 82–84 in the digital image of paper 12c. If special command mark 80 is written on paper 12c, then secondary command marks 82–84 are recognized by recognizer program 22 and processed as executable commands which may be executed immediately or a later time. In an embodiment of process 10, special command mark 80 is only recognized by recognizer program if written on a specific region of paper 12c, for example, near a corner of paper 12c.

Recognizer program 22 uses a pattern recognition process to identify the command marks. The pattern recognition process may be based on a statistical model, a neural network model, and/or a Hidden Markov model.

Recognizer program 22 may apply a machine learning process to better identify command marks from a particular writer. The machine learning process may use heuristic techniques to enhance the pattern recognition accuracy by determining common traits and tendencies included in previously recognized command marks made by a particular writer.

The recognition of command marks may be intentionally constrained by recognizing only those command marks made in specific regions of paper 30. For example, on paper 12a, process 10 may only recognize command marks written to the left of a side margin line 68 or above a top margin line 70.

The recognized commands may be executed immediately by computer 24, or may be stored as executable commands in a file on storage device 26. Similarly, the digital image file may be stored on storage device 26. By storing the command file and the digital image file, the writer has the opportunity to review both files for accuracy, and make corrections as required, before the commands are executed or the text is changed by executing a recognized command.

As discussed previously, process 10 may be performed by writing a command mark that is detected by a digital ink capturing device 16. Detecting digital ink refers to a process of detecting the stroke of a writing implement on the surface of a digital ink capture pad. The detected strokes are then converted to digital stroke data 20 which may be analyzed by recognizer program 22 in a manner similar to the scanned digital image 18 described previously. In an embodiment of process 10, a piece of paper 12 is placed on top of a digital ink capture pad 16 and a writer writes a command mark on paper 12. Capture pad 16 detects the strokes made through the paper onto the capture pad and converts the stroke information into digital stroke data 20. Recognizer program 22 recognizes the command mark represented by the digital stroke data 20 as an executable command and executes the command on computer 24, or stores the executable command in a file on storage device 26.

In an embodiment of process 10, a conventional writing implement, such as a pen or pencil, includes a digital ink capturing device attached to the writing implement. Command marks are then written onto a conventional writing medium, such as a piece of paper or cardboard, and the digital ink capturing device outputs stroke information which is used by recognizer program 22 to recognize command marks. An example of a digital ink capturing device that may be attached to a writing implement is an optical scanner attached near the tip of the writing implement, the optical scanner using a paper's surface patterns to detect movements and stroke information from the movement of the pen or pencil. Other types of digital ink capture devices could be used with process 10 to capture digital stroke information based on command marks made with a conventional writing implement, such as a pen or pencil, onto a conventional writing medium.

Figure 3:
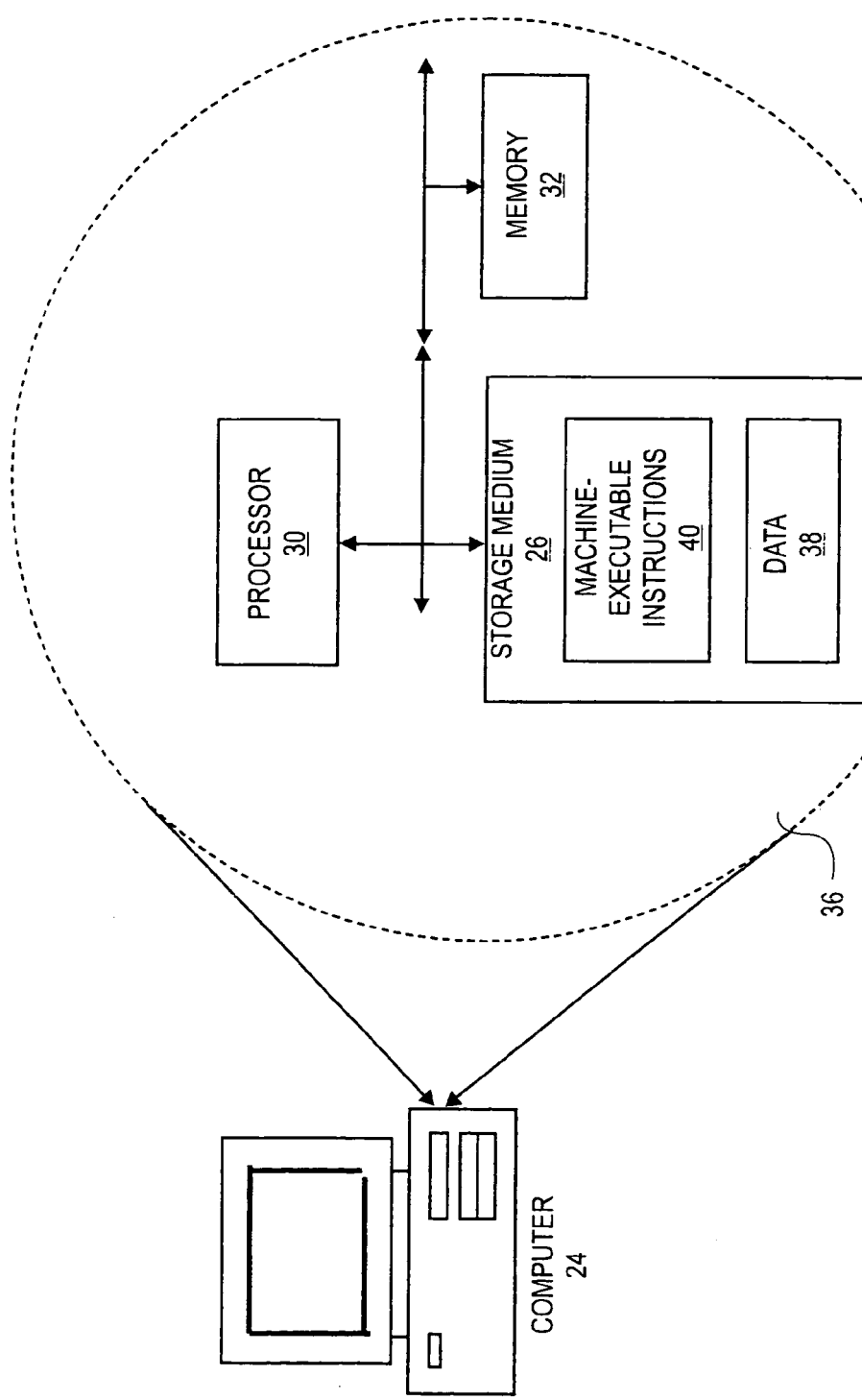
FIG. 3 is a block diagram of computer hardware on which the command recognition process may be implemented.

FIG. 3 shows computer 24 on which process 10 may be implemented. Computer 24 includes a processor 30, a memory 32, and a storage medium 26 (see view 36). Storage medium 26 stores data 38 for digital image files and machine-executable instructions 40 that are executed by processor 30 out of memory 32 to perform command recognition process 10.

Process 10 is not limited to use with the hardware and software of FIG. 3. It may find applicability in any computing or processing environment. Process 10 may be implemented in hardware, software, or a combination of the two. Process 10 may be implemented in computer programs executing on programmable computers or other machines that each include a processor, a storage medium readable by the processor (including volatile and non-volatile memory and/or storage components), at least one input device, and one or more output devices. The input/output device may include wireless communications port to send and received signals to a digital ink capture device. The input/output device may include a device that communicates using a wireless protocol, such as a Bluetooth protocol.

Program code may be applied to data entered using an input device (e.g., a mouse or keyboard) to perform process 10 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on a storage medium (e.g., a magnetic disk, RAM or ROM) that is readable by a general or special purpose programmable computer for configuring and operating the computer when the storage medium or device is read by the computer to perform process 10. Process 10 may also be implemented as a machine-readable storage medium, configured with a computer program, where, upon execution, instructions in the computer program cause a machine to operate in accordance with process 10.

In an embodiment, process 10 is performed by writing a command mark on a conventional medium, such as a piece of paper, cardboard or plastic, with the command mark being written with a conventional writing implement such as a pen or a pencil and the written command mark on the conventional medium is then scanned as a digital image which is then processed by a recognizer program.

In an embodiment, process 10 is performed by writing a command mark onto a pre-printed medium, such as a pre-printed piece of paper or cardboard, with the command mark being written with a conventional writing implement such as a pen or a pencil, the pre-printed document with the written command mark is then scanned as a digital image which is then processed by the recognizer program.

As used herein, the term "command mark" may refers to written alphabetic characters and also may refer to glyphs that represent non-verbal information (such as a circled letter, a star symbol, etc.)

In an embodiment, the recognizer program uses a combination of pattern matching and image processing schemes with applied heuristics. The recognizer program may operate by performing pattern recognition using either a template-based recognition scheme or by employing a Hidden Markov Model (HMM) scheme combined with an appropriate feature extraction method. The following pseudo-code describes a template-based recognition scheme, which may be used to recognize command marks by broadly classifying them into "X-based" commands and "O-based" commands, and then analyzing the recognized command marks for further classification. The following pseudo-code may also be used to distinguish between a check mark and an X-mark, for example:

1. Segment the scanned image into connected areas.
2. For each such segment (corresponding to a letter, a word portion, a drawing element, or a command):
    2a. Is the image of the appropriate size? (Discard segments that are too small or too large, to avoid conflicts with letters and text);
    2b. Is the image in the right portion of the page? (To enforce a convention that command markes must be made in the left half of the image, for example);
3. Match the segment to a template:
3a. Does this segment match an O-shaped command mark? If it does: Draw axes through a centroid of a bounding box surrounding the command mark. If most of the image data is at approximately the same distance from the center of the bounding box, this command mark is recognized as an O-shaped command pattern.
    3b. Or does this segment match an X-shaped command? If it does: Draw strips through a centroid of a bounding box surrounding the command mark. If most of the image data is within these strips, then this command mark corresponds to an X-shaped command.
4. Perform more analysis to distinguish the recognized command mark from other command marks. For example is the command mark an X-shape or an asterisk? Or, is it an O-shape or a cipher?

In an embodiment, the recognizer program may be used to identify text printed on a conventional medium, as described previously. The recognizer program may include a scheme to recognize the printed text by recognizing at least one common characteristic associated with a section of a scanned image. For example, recognizing the uniformity of spacings (inter-word, inter-line, inter-paragraph) and/or recognizing that several letters share the same size or the same font attributes (ascenders, descenders, curves), and/or recognizing "neatness", i.e., recognizing at least one margin is substantially aligned with another margin line (for example, where margin lines are horizontal, and/or parallel).

The recognizer program may apply an image processing scheme that enables the recognition of image elements that are blurred and/or smeared through resolution changing mechanisms. By applying such a scheme in conjunction with Hough transforms, printed text of a certain size may be further recognized. Similarly, templates based on font attributes (curves of 'd', 'b', 'p', or ascenders for 'k', descenders for 'g', 'j', etc.) can be applied on each recognized text line to ascertain uniformity and classify elements as printed.

The invention is not limited to the specific embodiments described above. For example, we mentioned a piece of paper as the medium on which command marks are made. However, any medium that can be written on and subsequently scanned could be used, such as cardboard, metal, plastic, cloth, etc. Also, we mentioned using a pen or pencil as the writing implement. However, any implement that can be used to make a command mark on a suitable medium could be used.

Other embodiments not described herein are also within the scope of the following claims.

What is claimed is:

1. A method comprising:
   obtaining a scanned handwritten command mark written with a conventional writing implement onto a conventional medium, wherein the conventional writing implement includes at least one of a pen and pencil and wherein the conventional medium includes at least one of a piece of paper, cardboard, plastic, metal, or cloth; and
   recognizing the scanned handwritten command mark as a command that may be executed by a processor, wherein the scanned handwritten command mark is recognized only if the scanned handwritten command mark is placed on a specified area of the conventional medium.

2. The method of claim 1, wherein the scanned handwritten command mark comprises one of a notational, transformational and operational mark.

3. The method of claim 2, wherein the notational mark comprises important phrases, dates and keywords.

4. The method of claim 2, wherein the operational mark comprises operations to be performed by the processor.

5. The method of claim 2, wherein the transformational mark comprises transformations to a specific section of pre-printed text included on the conventional medium.

6. The method of claim 1, wherein recognizing comprises:
   recognizing a pattern associated with the scanned handwritten command mark based on one of a statistical model, a neural network model, and a Hidden Markov model.

7. The method of claim 6, wherein recognizing further comprises:
   applying heuristic techniques to enhance accuracy of the pattern recognition, the heuristic techniques being based on previous interpretations of a command mark.

8. The method of claim 1, further comprising obtaining secondary command marks handwritten on the conventional medium, wherein the scanned handwritten command mark is recognized before the secondary command marks are recognized as executable commands.

9. The method of claim 1, wherein the medium includes pre-printed text, wherein when the recognized command mark is executed, the pre-printed text is affected.

10. The method of claim 1, further comprising:
    executing the recognized command in the processor.

11. The method of claim 1, further comprising:
    storing the recognized command in memory.

12. The method of claim 1, wherein the scanned command mark comprises at least one of a handwritten alphabetic character and/or a glyph that represents non-verbal information.

13. A method comprising:
    detecting stroke information associated with making a handwritten command mark with a conventional writing implement on a conventional medium, wherein the conventional writing implement includes at least one of a pen and pencil and wherein the conventional medium includes at least one of a piece of paper, cardboard, plastic, or cloth; and
    recognizing the handwritten command mark as a command that may be executed by a computer processor, wherein the handwritten command mark is recognized only if the handwritten command mark is placed on a specified area of the conventional medium.

14. The method of claim 13, wherein the handwritten command mark comprises one of a notational, transformational and operational mark.

15. The method of claim 13, wherein recognizing comprises:
    recognizing a pattern associated with the stroke information based on one of a statistical model, a neural network model, and a Hidden Markov model.

16. The method of claim 15, wherein recognizing further comprises:
    applying heuristic techniques to enhance accuracy of the pattern recognition, the heuristic techniques being based on previous interpretations of a command mark.

17. The method of claim 13, further comprising obtaining secondary command marks written on the conventional medium, wherein the handwritten command mark is recognized before the secondary command marks are recognized as executable commands.

18. The method of claim 13, further comprising:
    executing the recognized command in the processor.

19. The method of claim 13, further comprising:
    storing the recognized command in memory.

20. The method of claim 13, wherein the conventional writing implement includes a digital ink capturing device attached to the conventional writing implement.

21. An article comprising a machine-readable medium that stores machine-executable instructions for recognizing a command mark handwritten with a conventional writing implement onto a conventional medium, wherein the conventional writing implement includes at least one of a pen and pencil and wherein the conventional medium includes at least one of a piece of paper, cardboard, plastic, metal or cloth, the instructions causing a machine to:
    recognize the handwritten command mark as a command that may be executed in a processor, wherein the handwritten command mark is recognized only if the handwritten command mark is written on a specific area of the conventional medium.

22. The article of claim 21, wherein the handwritten command mark comprises one of a notational, transformational and operational mark.

23. The article of claim 21, wherein recognizing comprises recognizing a pattern associated with the handwritten command mark based on one of a statistical model, a neural network model, and a Hidden Markov model.

24. The article of claim 21, wherein the conventional medium includes pre-printed text, wherein when the recognized handwritten command mark is executed, the pre-printed text is affected.

25. The article of claim 21, wherein the instructions cause the machine to execute the recognized command.

26. The article of claim 21, wherein the instructions cause the machine to store the recognized command in memory.

27. A command recognition apparatus, comprising:
a memory that stores executable instructions; and
a processor that executes the instructions to:
recognize a scanned image of a command mark as a command that may be executed by a computer processor, wherein the command mark is handwritten with at least one of a pen and pencil onto a conventional medium, the conventional medium including at least one of a piece of paper, cardboard, plastic, metal, or cloth, wherein the command mark is recognized only if the command mark is written on a specific area of the medium.

28. The apparatus of claim 27, wherein the command mark comprises one of a notational, transformational and operational mark.

29. The apparatus of claim 27, wherein the recognized command is executed by the processor.

30. The apparatus of claim 27, wherein the processor executes instructions to store the recognized command.

* * * * *